US012117757B2

(12) United States Patent
Toda et al.

(10) Patent No.: US 12,117,757 B2
(45) **Date of Patent: *Oct. 15, 2024**

(54) IMAGE FORMING APPARATUS

(71) Applicant: CANON KABUSHIKI KAISHA, Tokyo (JP)

(72) Inventors: Atsushi Toda, Shizuoka (JP); Hisashi Taniguchi, Shizuoka (JP); Bunro Noguchi, Shizuoka (JP); Shunsuke Matsushita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,977

(22) Filed: Nov. 9, 2022

(65) Prior Publication Data

US 2023/0093245 A1 Mar. 23, 2023

Related U.S. Application Data

(63) Continuation of application No. 17/534,277, filed on Nov. 23, 2021, now Pat. No. 11,526,115, which is a continuation of application No. 17/208,895, filed on Mar. 22, 2021, now Pat. No. 11,209,768.

(30) Foreign Application Priority Data

Mar. 30, 2020 (JP) ................................ 2020-060759

(51) Int. Cl.
*G03G 21/00* (2006.01)

(52) U.S. Cl.
CPC ..... *G03G 21/0058* (2013.01); *G03G 21/0064* (2013.01); *G03G 21/0082* (2013.01); *G03G 2221/0026* (2013.01); *G03G 2221/0042* (2013.01); *G03G 2221/0063* (2013.01)

(58) Field of Classification Search
CPC .................................................. G03G 21/0058
See application file for complete search history.

(56) References Cited

U.S. PATENT DOCUMENTS 5,060,023 A * 10/1991 Higashiguchi ..... G03G 15/0921 399/277
5,778,286 A * 7/1998 Kido .................. G03G 5/14773 399/265
6,208,826 B1 * 3/2001 Yoshinaga ......... G03G 15/1685 399/318

(Continued)

FOREIGN PATENT DOCUMENTS

JP H03231789 A 10/1991
JP H06332301 A 12/1994

*Primary Examiner* — Leon W Rhodes, Jr.
(74) *Attorney, Agent, or Firm* — Canon U.S.A., Inc. IP Division

(57) ABSTRACT

An image forming apparatus includes a photosensitive drum, a development roller configured to supply developer to the photosensitive drum, a transfer roller configured to transfer a developer image formed on the photosensitive drum to a recording material, and a cleaning roller being in contact with the photosensitive drum, configured to clean a part of the recording material adhered to the photosensitive drum, wherein the diameter of the transfer roller is greater than the diameter of the development roller and the diameter of the cleaning roller is greater than the diameter of the development roller.

8 Claims, 4 Drawing Sheets

(56) References Cited

U.S. PATENT DOCUMENTS

| | | | | |
|---|---|---|---|---|
| 8,034,519 | B2 * | 10/2011 | Sakimura ............ | G03G 5/0605 430/72 |
| 8,831,473 | B2 * | 9/2014 | Hashimoto ........ | G03G 21/1647 399/111 |
| 2010/0260511 | A1 * | 10/2010 | Kojima .............. | G03G 21/0058 399/46 |

* cited by examiner

IMAGE FORMING APPARATUS

CROSS-REFERENCE TO RELATED APPLICATIONS

The present application is a continuation of U.S. patent application Ser. No. 17/534,277, filed on Nov. 23, 2021, which is a continuation of U.S. patent application Ser. No. 17/208,895, filed on Mar. 22, 2021 and issued as U.S. Pat. No. 11,209,768 on Dec. 28, 2021, which claims priority from Japanese Patent Application No. 2020-060759 filed Mar. 30, 2020, which are hereby incorporated by reference herein in their entireties.

BACKGROUND OF THE DISCLOSURE

Field of the Disclosure

The present disclosure relates to image forming apparatuses such as a copying machine, a printer, and a facsimile employing an electrostatic recording method and an electrophotographic recording method.

Description of the Related Art

Conventionally, an electrophotographic image forming apparatus that forms an image on a recording material by executing a series of image forming processing including charging, exposure, development, transfer, cleaning, and fixing has been known. In recent years, for the purposes of miniaturization of an image forming apparatus and reduction of a toner consumption amount, an image forming apparatus configured to bring toner remaining on a drum after transfer processing (hereinafter, called "transfer residual toner") back to a development container has been provided. The above-described image forming apparatus is a cleaner-less type image forming apparatus. However, the apparatus of this type can easily capture fine paper dust existing on a sheet surface to the development container via a development roller together with the transfer residual toner. Herein, "paper dust" refers to minute solid materials such as a paper-derived pulp fiber and a filler separated from paper.

When more than a certain amount of captured paper dust is adhered to the development roller, image defects such as image unevenness and spots occur. When paper dust is adhered to toner, adhered paper dust has a negative effect on a charging characteristic of toner, so that an image defects such as image fogging occurs. Hereinafter, an image defect caused by the paper dust is called "paper dust contamination". The above-described image defects are likely to occur in an image forming apparatus configured to directly transfer a toner image formed on a drum to a sheet.

In a case where the amount of paper dust on a photosensitive body (i.e., drum) is small, the paper dust is trapped by foam cells of a cleaning roller when transfer residual toner and paper dust on the drum is temporarily collected and brought back to the drum by the cleaning roller. Therefore, it is possible to suppress the amount of paper dust that is to be captured into the development container. Further, in a case where the transfer roller includes a foam body, the transfer roller can function as a trap of the paper dust in a similar way as the cleaning roller to contribute to reduction of the amount of paper dust on the drum. According to a technique discussed in Japanese Patent Application Laid-Open No. 2016-145883, paper dust is separately collected by a roller to collect the paper dust, which is arranged to further abut on a cleaning roller, so that a lifetime of paper dust collection capability can be prolonged.

However, in a case where paper of a type that easily generates paper dust is continuously fed, the amount of paper dust on the photosensitive drum is increased, so that paper dust cannot be sufficiently processed by the above-described processing for separating and collecting the paper dust. In this case, the amount of paper dust collected to the development container is increased eventually, so that paper dust contamination is likely to occur. Accordingly, there is a demand for a structure capable of suppressing occurrence of image defects caused by paper dust by reducing an amount of paper dust adhered to the development roller through a simple setting even in a case where the amount of paper dust on a photosensitive drum is large.

SUMMARY OF THE DISCLOSURE

An image forming apparatus includes a photosensitive drum, a development roller configured to supply developer to the photosensitive drum, a transfer roller configured to transfer a developer image formed on the photosensitive drum to a recording material, and a cleaning roller being in contact with the photosensitive drum, configured to clean a part of the recording material adhered to the photosensitive drum, wherein a diameter of the transfer roller is greater than a diameter of the development roller and a diameter of the cleaning roller is greater than the diameter of the development roller.

Further features of the present disclosure will become apparent from the following description of exemplary embodiments with reference to the attached drawings.

DESCRIPTION OF THE EMBODIMENTS

<Description of Image Forming Apparatus>

Figure 1:
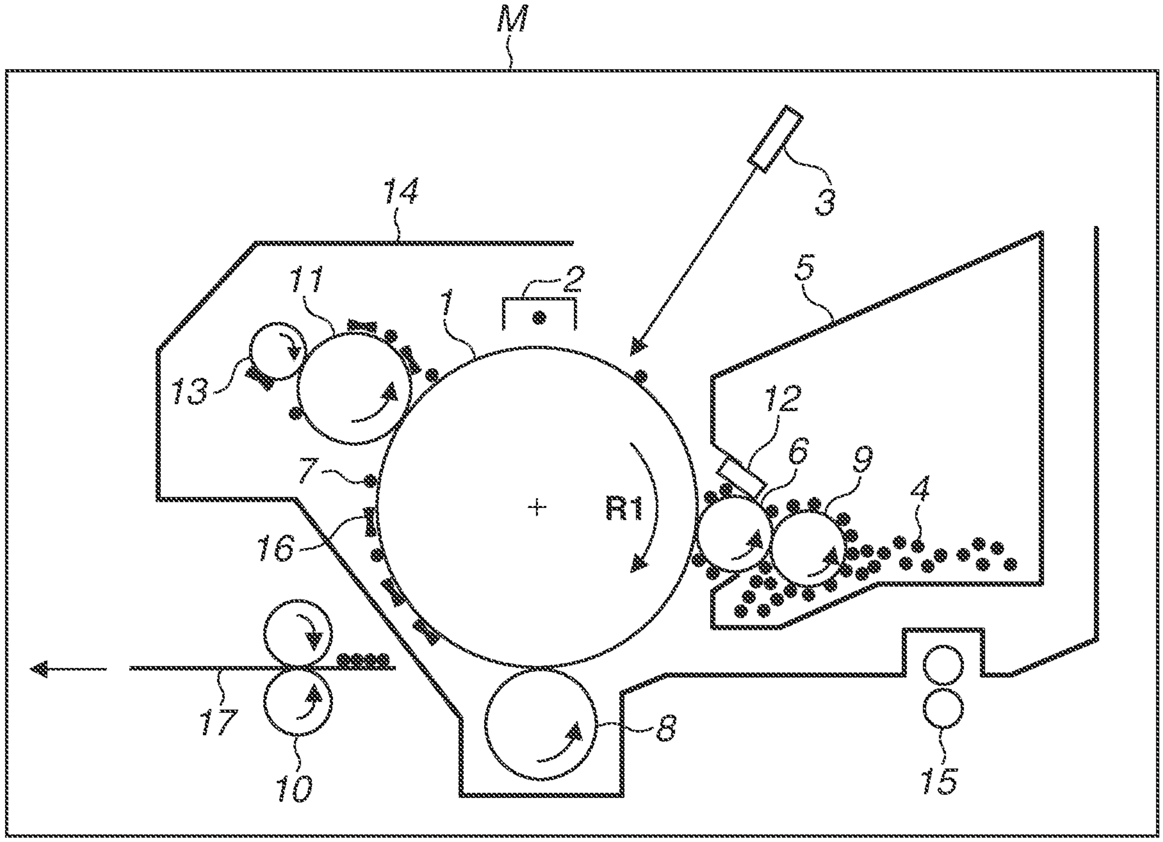
FIG. 1 is a schematic diagram illustrating a cross-sectional view of an image forming apparatus according to a first exemplary embodiment.

One example of an electrophotographic image forming apparatus is illustrated in FIG. 1. An image bearing body of a drum-type 1 serving as a body to be charged (hereinafter, called "photosensitive drum") is arranged in a main body M of the image forming apparatus. The photosensitive drum 1 (image bearing body 1) is formed of an organic optical-semiconductor photosensitive layer having a diameter of φ30 mm, and the photosensitive drum 1 is rotationally driven in a direction indicated by an arrow R1 at a predetermined processing speed (circumferential speed).

A surface of the photosensitive drum 1 is uniformly charged in a predetermined polarity and potential by a charging member 2 to which a bias is applied. The surface of the charged photosensitive drum 1 is exposed to and scanned with a laser beam output from a laser beam scanner 3 serving as an exposure unit, so that an electrostatic latent image corresponding to image information is formed thereon.

Developer 4 (hereinafter, called "toner") within a development unit 5 is supplied to a development roller 6 via a supply roller 9, and regulated to a predetermined layer thickness by a development blade 12. Thereafter, because of an electrostatic force caused by a developing bias, developer 4 is developed on the surface of the photosensitive drum 1 on which the electrostatic latent image is formed, so that a toner image (developer image) is formed on the photosensitive drum 1. For example, mono-component non-magnetic developer or mono-component magnetic developer is used as the developer 4.

On the other hand, a recording material 17 (hereinafter, called "transfer paper 17") is conveyed to a place (transfer nip) between the photosensitive drum 1 and the transfer roller 8 via a conveyance roller 15, and a toner image is transferred to a surface of the transfer paper 17 from the photosensitive drum 1. A positive or a negative direct voltage as a transfer bias is applied to the transfer roller 8 from the photosensitive drum 1, so that the toner image is transferred to the transfer paper 17. Depending on a normal polarity of the toner, a transfer bias of a positive polarity or a negative polarity is applied thereto. Then, the transfer paper 17 is separated from the photosensitive drum 1 and conveyed to a fixing unit 10, and the toner image transferred to the transfer paper 17 is heated, pressurized, and fixed to the transfer paper 17 by the fixing unit 10.

Herein, after the toner image is transferred, transfer residual toner 7 remaining on the surface of the photosensitive drum 1 without being transferred to the transfer paper 17 and paper dust 16 coming off from the surface of the transfer paper 17 are collected from the surface of the photosensitive drum 1 by a cleaning roller 11 to which a collection bias is applied.

The paper dust 16 collected by the cleaning roller 11 is separated therefrom by a paper dust collection roller 13 to which a bias for collecting only the paper dust is applied, and collected into a collection container 14. When image formation is not executed, a return bias is applied to the cleaning roller 11, so that the transfer residual toner 7 remaining on the cleaning roller 11 is transferred to the photosensitive drum 1. Hereinafter, the cleaning roller 11, the paper dust collection roller 13, and the collection container 14 are collectively called a paper dust collection mechanism.

In order to realize the above-described behavior, a polarity and a magnitude of the bias are arbitrarily set depending on the charging characteristic of toner and a development method, e.g., a reversal development method for adhering toner to an exposed portion or a normal development method for adhering toner to a non-exposed portion. Generally, elements, which constitute the paper dust, e.g., a loading material and a pulp fiber, exhibit a negative polarity in which the elements are charged negatively. Thus, in terms of ease of separation of paper dust from toner and ease of adjustment of a charging polarity of the photosensitive drum 1, the reversal development method is desirably selected using positive-charged toner having a positive polarity opposite to the polarity of the constituent elements of the paper dust.

Then, the transfer residual toner 7 transferred to the photosensitive drum 1 is collected by the development roller 6. The development roller 6, the transfer roller 8, and the cleaning roller 11 have elasticity, and are in contact with the photosensitive drum 1 by a predetermined intrusion amount (deformation amount).

Hereinafter, a situation considered as an issue and an overview of a solution to the issue will be described.

In a case where paper of a type that easily generates paper dust is fed continuously, more than a usual amount of paper dust 16 may be adhered to the photosensitive drum 1. In this case, the amount of adhered paper dust may exceed paper dust collection capability of the paper dust collection mechanism. If an excessive amount of paper dust on the photosensitive drum 1 cannot be resolved and is prolonged for a long time after the last toner image transfer is completed, the paper dust is improperly collected by the development roller 6. Accordingly, paper dust contamination occurs. Once the paper dust is collected thereby, it will be difficult to discharge the paper dust 16 therefrom unless the paper dust 16 is intentionally discharged on the photosensitive drum 1 together with the toner. This is problematic because the image defect is also prolonged for a long time.

However, through an earnest study conducted by the inventor, it has been found that there is a relative difference between a paper dust capturing capability of the transfer roller 8 and that of the development roller 6, both of which are in contact with the photosensitive drum 1, so that the amount of paper dust collected by the development roller 6 can be suppressed by such difference.

The transfer roller 8 in a comparatively clean state has an effective paper dust buffering function, i.e., a function of temporarily retaining paper dust. Thus, the transfer roller 8 can remove the paper dust 16 from the photosensitive drum 1 and retain the paper dust 16 temporarily in a case where the excessive amount of paper dust 16 is adhered to the photosensitive drum 1. The inventor has found that, although the function has a temporary effect and an upper limit on the paper dust capturing amount, an amount of paper dust transferred to the development roller 6 from the photosensitive drum 1 can be reduced by this temporary paper dust capturing function of the transfer roller 8, so that occurrence of paper dust contamination can be significantly suppressed. As described below, paper dust temporarily captured by the transfer roller 8 can be collected by the paper dust collection mechanism after a certain period of time.

In order to relatively enhance the paper dust buffering function of the transfer roller 8 to reduce the amount of paper dust collected by the development roller 6, a contact area of the photosensitive drum 1 and the development roller 6 is set to be smaller than a contact area of the photosensitive drum 1 and the transfer roller 8. Although there are various methods for decreasing (or increasing) a contact area of a cylindrical elastic body, a simplest method is to make a diameter (hereinafter, simply called "dia.") of the cylindrical elastic body be smaller (or larger). In the image forming apparatus that collects transfer residual toner by the development roller 6, directly transfers a toner image formed on the photosensitive drum 1 to a transfer sheet such as paper, and further includes a paper dust collection mechanism including the cleaning roller 11, it is desirable to set a diameter of the development roller 6 to be smaller than a diameter of the transfer roller 8. In other words, this setting can be an effective prevention measure of the paper dust contamination.

A specific configuration of the first exemplary embodiment will be described below. As an exemplary embodiment 1-1, a study was conducted based on conditions that diameters of a development roller, a transfer roller, and a cleaning roller were φ13.0 mm, φ14.8 mm, and φ14.2 mm, respectively. A diameter of a supply roller was φ130.0 mm. A ratio of the diameter of the development roller to the diameter of the photosensitive drum was 0.433. Further, as an exemplary embodiment 1-2, a diameter of the development roller in the exemplary embodiment 1-1 was changed to φ14.0 mm (i.e., Diameter of the Development Roller≤14 mm), whereas the other conditions were the same as those of the exemplary embodiment 1-1. A ratio of the diameter of the development roller to the diameter of the photosensitive drum was 0.467. As comparison examples 1 and 2, the diameter of the development roller specified in the exemplary embodiment 1-1 was changed to φ15.0 mm and φ18.0 mm, whereas the other conditions were the same as those specified in the exemplary embodiment 1-1. Ratios of the diameters of the development roller to the diameter of the photosensitive drum were 0.500 and 0.600, respectively.

Figure 2:
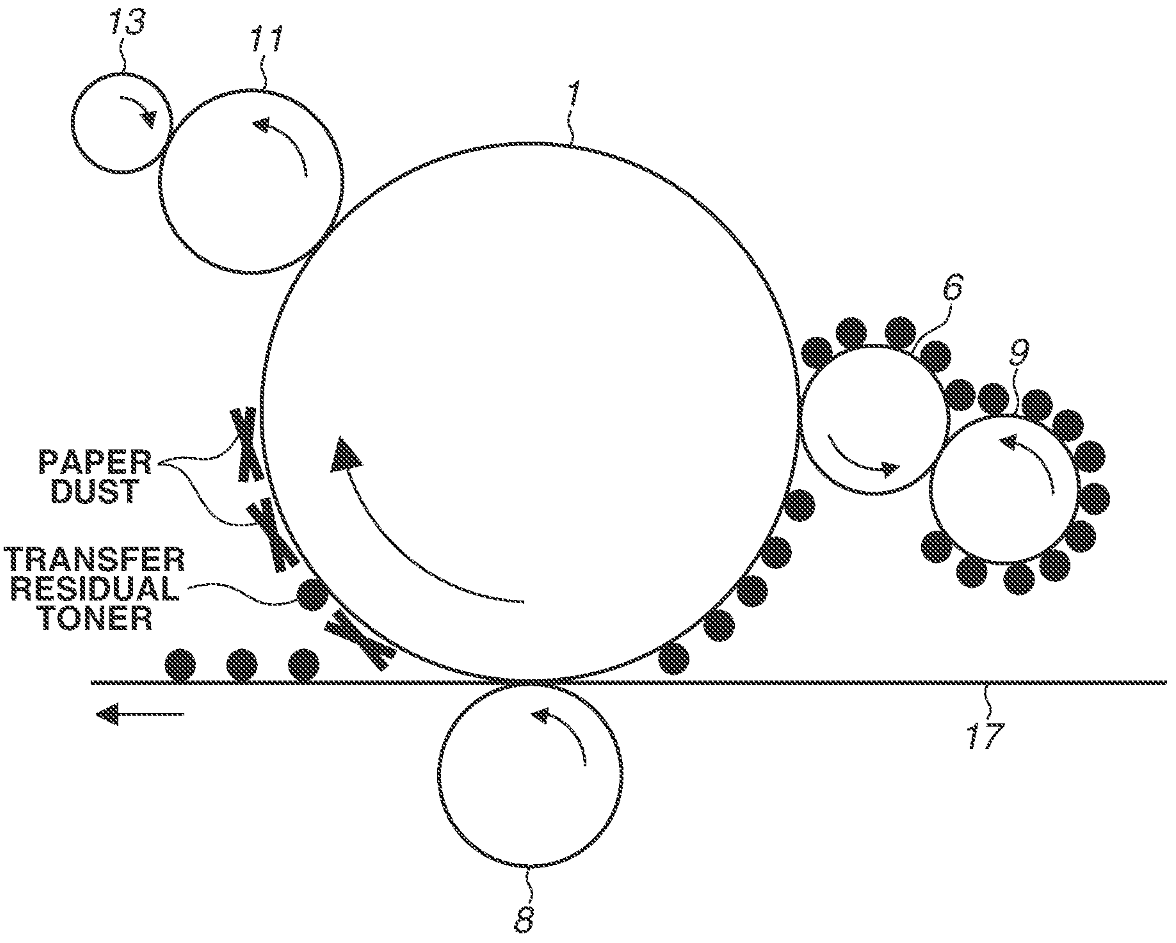
FIG. 2 is a schematic diagram illustrating a drum surface after execution of transfer processing according to the first exemplary embodiment.

Hereinafter, a collection state of the paper dust 16 will be described with reference to FIGS. 2 to 4. As illustrated in FIG. 2, when a toner image formed on the photosensitive drum 1 is transferred to a transfer paper by applying a transfer bias to the transfer roller 8, a part of the paper dust 16 adhered to the transfer paper is adhered to the surface of the photosensitive drum 1.

toner, paper dust 16 is unavoidably captured together with the collected transfer residual toner. However, in a case where the paper dust 16 is charged, transfer of the paper dust 16 can be suppressed by adjusting a direction of the applied bias between the development roller 6 and the photosensitive drum 1. Particularly, transfer of the paper dust 16 can be comparatively suppressed when toner has a normal charging polarity that is opposite to a charging polarity of the paper dust 16, (i.e., when the toner is positive toner having a positive polarity because the charging polarity of the paper dust 16 tends to be a negative polarity). However, the above described bias adjustment is less effective when the paper dust 16 has almost no electric charge. As illustrated in the following table 1, transfer of such paper dust 16 to the development roller 6 depends on a width in a circumferential direction of the development area, i.e., a development nip width. Transfer of the paper dust 16 to the development roller 6 from the photosensitive drum 1 can be reduced in a case where a length or a time of contact with the development roller 6 is shorter. In other words, a paper dust transfer rate of the paper dust 16 transferring to the development roller 6 from the photosensitive drum 1 can be lowered. In addition, it has been found that the paper dust transfer rate can be further lowered in a case where the development nip width is shorter.

TABLE 1

| | Drum Dia. (φ mm) | Development Roller Dia. (φ mm) | Transfer Roller Dia. (φ mm) | Cleaning Roller Dia. (φ mm) | Dia. Ratio of Development Roller/Drum | Development Nip Width (mm) | Paper Dust Transfer Rate (%) |
|---|---|---|---|---|---|---|---|
| First Exemplary Embodiment 1-1 | 30 | 13 | 14.8 | 14.2 | 0.433 | 5.5 | 30 |
| First Exemplary Embodiment 1-2 | 30 | 14 | 14.8 | 14.2 | 0.467 | 5.7 | 38 |
| Comparison Example 1 | 30 | 15 | 14.8 | 14.2 | 0.500 | 5.85 | 43 |
| Comparison Example 2 | 30 | 18 | 14.8 | 14.2 | 0.600 | 6.25 | 46 |

Figure 3:
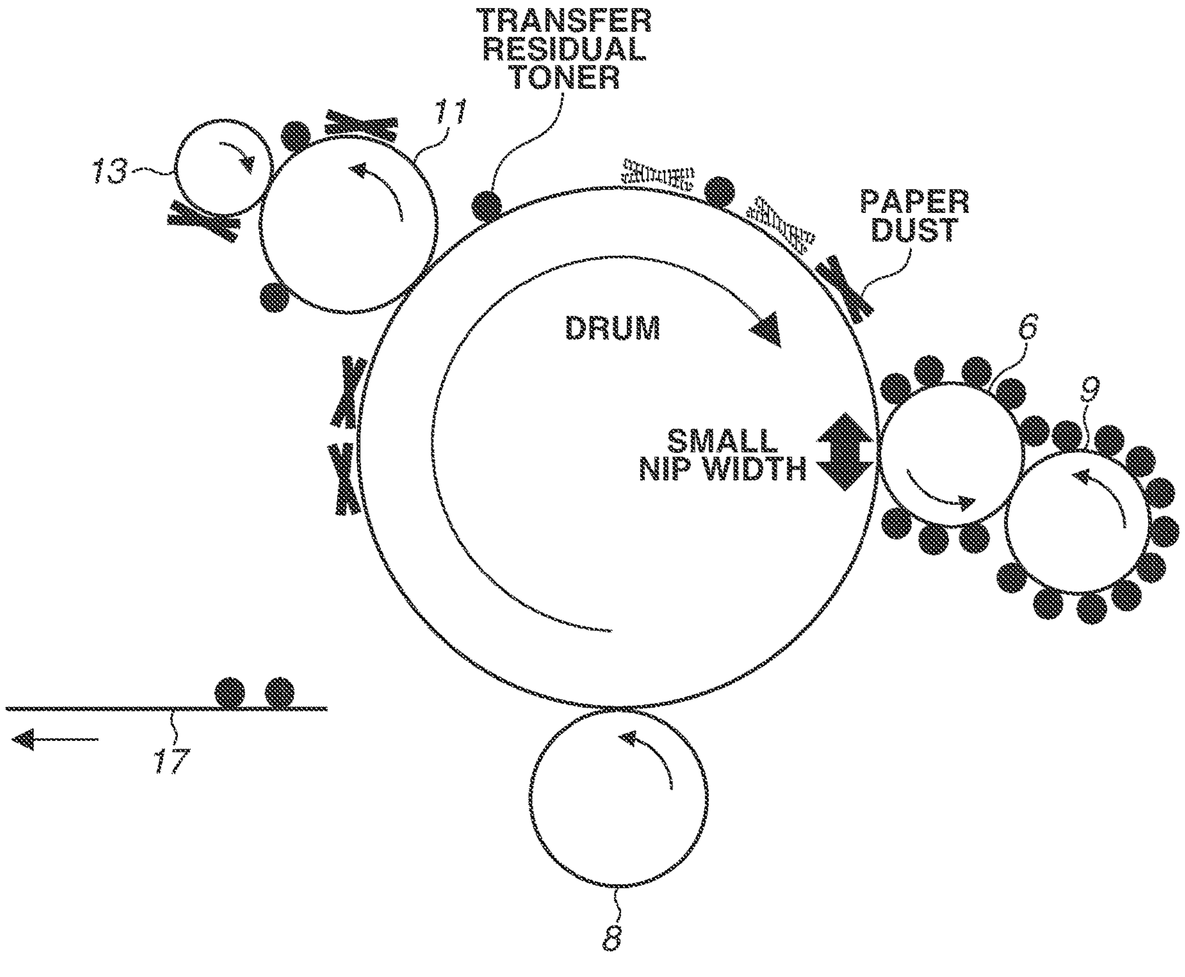
FIG. 3 is a schematic diagram illustrating a drum surface after execution of cleaning processing according to the first exemplary embodiment.
Figure 4:
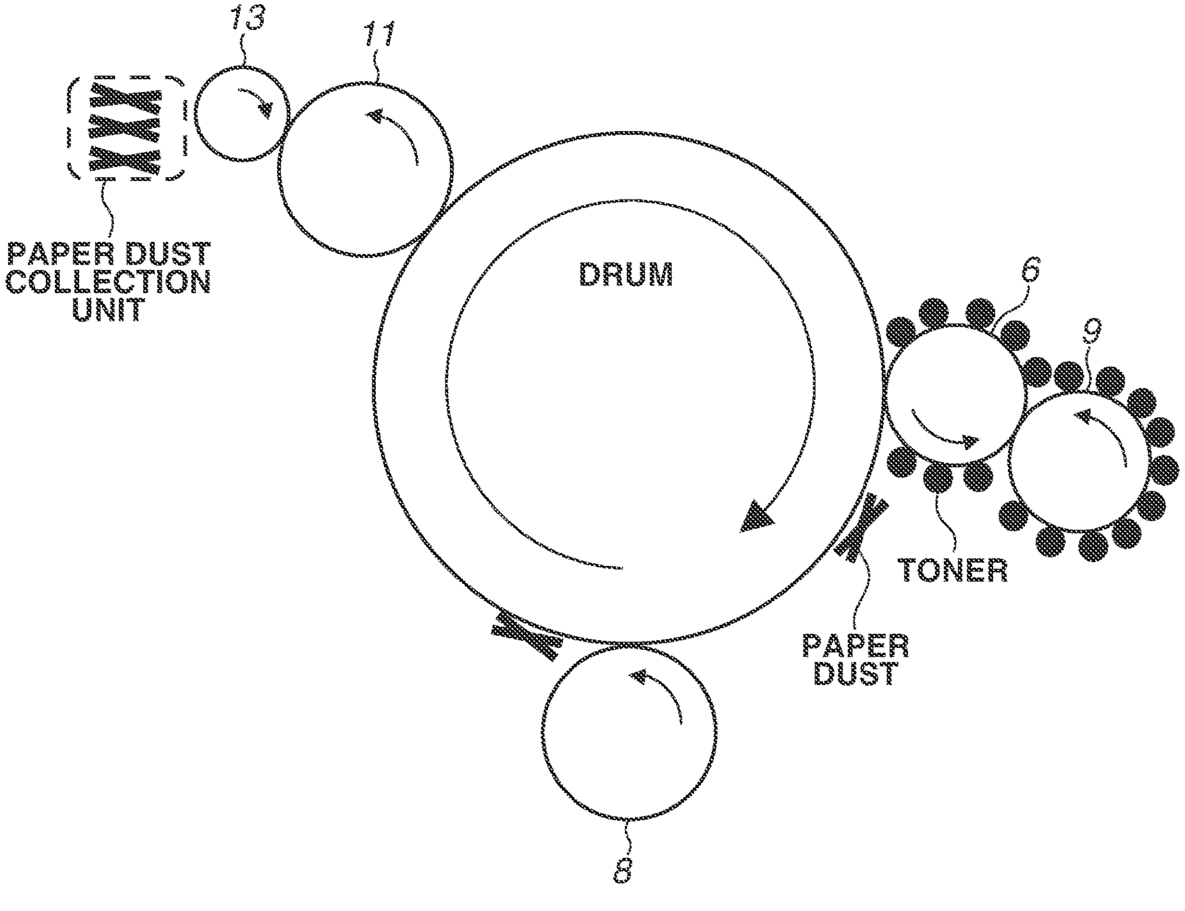
FIG. 4 is a schematic diagram illustrating a state where paper dust cannot easily be collected by a development roller.

Then, as illustrated in FIG. 3, the paper dust 16 adhered to the photosensitive drum 1 is collected by the cleaning roller 11 when the paper dust 16 passes through an abutting area (hereinafter, called "collection area") of the cleaning roller 11 and the photosensitive drum 1. Normally, in a case where an expected amount of paper dust exists, almost all of the paper dust is collected by the cleaning roller 11. However, as described above, in a case where an excessive amount of paper dust exists, only a part of the paper dust can be collected from the photosensitive drum 1 by the cleaning roller 11. Then, the paper dust that cannot be collected by the cleaning roller 11 passes through the collection area, and is conveyed to an abutting area of the development roller 6 and the photosensitive drum 1 regarded as a development area illustrated in FIG. 3.

At least a part of the paper dust 16 conveyed to the development area is transferred to the development roller 6. In the apparatus that intentionally collects transfer residual From among various types of paper dust, a foreign object (paper dust) such as a pulp fiber having a size larger than a size of toner is likely to cause image unevenness or spots. Transfer of such a foreign object tends to occur depending on a difference between the curvatures of the photosensitive drum 1 and the development roller 6. When such a long foreign object (paper dust) abuts on a member having a curved surface, it moves upward instead of moving along the curvature and tends to remain on a drum that is close to a plain surface, having a large contact area with a small curvature. Accordingly, as illustrated in the table 2, in order to suppress image unevenness and spots, it is desirable that a ratio of a diameter of the development roller to a diameter of the photosensitive drum be 0.467 or less. Further, assuming that a ratio, in which a contact area is decreased when only a diameter of the development roller is reduced, is defined as "a contact area ratio", it has been found that image unevenness and spots can be suppressed by setting the contact area ratio to 0.80 or less when a contact area of the development roller and the photosensitive drum having equal diameters is 1.

TABLE 2

| | Drum Dia. (φ mm) | Development Roller Dia. (φ mm) | Transfer Roller Dia. (φ mm) | Cleaning Roller Dia. (φ mm) | Dia. Ratio of Development Roller/Drum | Contact Area Ratio | Occurrence of Image Unevenness and Spot |
|---|---|---|---|---|---|---|---|
| First Exemplary Embodiment 1-1 | 30 | 13 | 14.8 | 14.2 | 0.433 | 0.76 | NO |
| First Exemplary Embodiment 1-2 | 30 | 14 | 14.8 | 14.2 | 0.467 | 0.79 | NO |
| Comparison Example 1 | 30 | 15 | 14.8 | 14.2 | 0.500 | 0.81 | YES |
| Comparison Example 2 | 30 | 18 | 14.8 | 14.2 | 0.600 | 0.86 | YES |

Therefore, to reduce the amount of paper dust captured by the development roller 6, it is effective to shorten the abutting time and reduce the diameter of the development roller 6 as much as possible. In other words, it is effective to increase a difference between the curvatures of the photosensitive drum 1 and the development roller 6. FIG. 4 is a schematic diagram illustrating a state where paper dust cannot be easily collected by the development roller 6. In FIG. 4, paper dust passes through the development area without being collected by the development roller 6.

Most of the paper dust 16, which is not transferred to the development roller 6 at the development area, is conveyed to a contact area of the transfer roller 8 and the photosensitive drum 1, i.e., a transfer area. As described above, the transfer roller 8 is a paper dust temporary retaining member functioning as a paper dust buffer.

Generally, the transfer roller 8 has a concavo-convex surface to reliably convey a sheet without making a sheet slip over its surface. Further, it is often a case that a surface thereof is made of a foam member. In many cases, the transfer roller 8 has a latent ability to physically scrape the paper dust 16 from the photosensitive drum 1 if there is a disparity between surface moving speeds of the transfer roller 8 and the photosensitive drum 1. However, a difference between the surface moving speeds is set within 1% to reliably transfer the toner image on a sheet without causing irregularities therein. Thus, removal efficiency of the foreign object on the photosensitive drum 1 is low. Even so, the transfer roller 8 has a function of removing a part of the paper dust 16 passing through the transfer area and retaining the removed paper dust on its surface.

Then, the paper dust 16 on the photosensitive drum 1 passing through the transfer area is removed again by the paper dust collecting mechanism including the cleaning roller 11. The paper dust 16 passes through the collection area if a large amount of paper dust 16 exists on the photosensitive drum 1. Then, the paper dust 16 is repeatedly captured by the development roller 6, and captured and temporarily retained by the transfer roller 8 until the amount of paper dust 16 on the photosensitive drum 1 becomes less than an amount collectable by the paper dust collection mechanism.

What is noteworthy here is the amount of paper dust retained by the transfer roller 8 and a ratio of the amount of paper dust captured by the development roller 6 and the amount of paper dust captured by the transfer roller 8. First, a paper dust retaining amount of the transfer roller 8 is increased, so that the paper dust retaining amount of the transfer roller 8 is prevented from reaching the upper limit. Then, in a case where a paper dust capturing efficiency of the transfer roller 8 is to be improved, the easiest and the most efficient way is to reduce the curvature difference by physically increasing the contact area of the transfer roller 8 and the photosensitive drum 1. The specific method is to increase a diameter of the transfer roller 8. An area of a circumference surface of the transfer roller 8 is increased by square times the ratio the diameter of the transfer roller 8 is increased. For example, if a diameter is increased by 10%, the circumferential surface is increased by 1.21 times or 20%. Thus, the paper dust retaining amount of the transfer roller 8 can be efficiently increased. Further, the paper dust capturing efficiency of the transfer roller 8 can be improved by applying a bias for attracting the paper dust 16 to the transfer roller 8. However, the upper limit of the paper dust retaining amount cannot be sufficiently raised, even if the above-described bias is simply applied thereto, so that it is desirable that the diameter of the transfer roller 8 be increased to retain the uncharged paper dust 16 or a pulp fiber having a considerably negative effect on an image. The paper dust 16 retained on the surface of the transfer roller 8 can be processed by a conventionally known method after a state of the excessive amount of paper dust 16 on the photosensitive drum 1 is resolved, so that the surface of the transfer roller 8 can be restored to a clean state. For example, conventionally, a method of collecting the paper dust 16 through a paper dust collection mechanism having the cleaning roller 11 via the photosensitive drum 1 by applying a bias for transferring the paper dust 16 to the transfer roller 8 from the photosensitive drum 1 has been known.

In short, in a case where an excessive amount of paper dust 16 is adhered to the photosensitive drum 1 because the amount of paper dust 16 exceeds a collection capability of the paper dust collection mechanism, the paper dust 16 on the photosensitive drum 1 is allocated to and captured by the paper dust collection mechanism, the development roller 6, and the transfer roller 8 through the rotation of the photosensitive drum 1 until the excessive state of the paper dust 16 is resolved. By simply increasing the ratio of the diameter of the transfer roller 8 to the diameter of the development roller 6 (i.e., a difference between the diameters), the paper dust 16, in which the paper dust 16 collected by the paper dust collection mechanism has been excluded, can be allocated in such a state that the amount of paper dust 16 captured by the transfer roller 8 is greater than the amount of paper dust 16 captured by the development roller 6. Therefore, sizes of respective rollers are selected and set so that lengths of respective diameters can satisfy a relationship of "Transfer Roller Dia.>Development Roller Dia.". In addition, similar to the relationship between the development roller 6 and the transfer roller 8, the diameter of the cleaning roller 11 should be larger than the diameter of the development roller 6. In other words, sizes of respective rollers are selected and set so that lengths of respective diameters can satisfy a relationship of "Cleaning Roller Dia.>Development Roller Dia.".

The paper dust retaining capability of the transfer roller 8 is gradually lowered because of contamination caused by long-term use. Thus, the transfer roller 8 should be periodically replaced together with the other consumable items such as the photosensitive drum 1 and a development device. Accordingly, it is desirable that the transfer roller 8 and the photosensitive drum 1 or the development device constitute an integrated replacement unit.

The diameters of respective rollers and a checking result of paper dust contamination level are illustrated in the following table 3. As illustrated in the table 3, in order to suppress occurrence of paper dust contamination, a diameter of the development roller has to be smaller than diameters of the transfer roller and the cleaning roller.

TABLE 3

| | Drum Dia. (φ mm) | Development Roller Dia. (φ mm) | Transfer Roller Dia. (φ mm) | Cleaning Roller Dia. (φ mm) | Dia. Ratio of Development Roller/Drum | Occurrence of Paper Dust Contamination |
|---|---|---|---|---|---|---|
| First Exemplary Embodiment 1-1 | 30 | 13 | 14.8 | 14.2 | 0.433 | NO |
| First Exemplary Embodiment 1-2 | 30 | 14 | 14.8 | 14.2 | 0.467 | NO |
| Comparison Example 1 | 30 | 15 | 14.8 | 14.2 | 0.500 | YES |
| Comparison Example 2 | 30 | 18 | 14.8 | 14.2 | 0.600 | YES |

In the above table 3, although the study was conducted using the photosensitive drum having a diameter of φ30 mm, even if a diameter of the photosensitive drum was changed based on a precondition that a diameter of the development roller was smaller than diameters of the transfer roller and the cleaning roller, a curvature difference was unchanged as long as the above-described ratio of the development roller diameter to the photosensitive drum diameter is the same because they are in similar shapes. In this case, frequency of occurrence of paper dust contamination was nearly unchanged. Accordingly, what is important is the ratio of the development roller diameter and the photosensitive drum diameter, and the diameter of the photosensitive drum in the first exemplary embodiment is not limited to φ30 mm.

Now, content of the study was practically checked using a photosensitive drum having a diameter of φ24 mm. A result of the checking is illustrated in the following table 4. From the table 4, it was found that, in order to suppress occurrence of paper dust contamination, the development roller diameter should be smaller than the transfer roller diameter and the cleaning roller diameter, and a ratio of the development roller diameter to the drum diameter should be 0.467 or less. In other words, "(Development Roller Dia./Image Bearing Body Dia.)≤0.467" should be satisfied.

TABLE 4

| | Drum Dia. (φ mm) | Development Roller Dia. (φ mm) | Transfer Roller Dia. (φ mm) | Cleaning Roller Dia. (φ mm) | Dia. Ratio of Development Roller/Drum | Occurrence of Paper Dust Contamination |
|---|---|---|---|---|---|---|
| First Exemplary Embodiment 1-1 | 24 | 10.4 | 14.8 | 14.2 | 0.433 | NO |
| First Exemplary Embodiment 1-2 | 24 | 11.4 | 14.8 | 14.2 | 0.467 | NO |

TABLE 4-continued

| | Drum Dia. (φ mm) | Development Roller Dia. (φ mm) | Transfer Roller Dia. (φ mm) | Cleaning Roller Dia. (φ mm) | Dia. Ratio of Development Roller/Drum | Occurrence of Paper Dust Contamination |
|---|---|---|---|---|---|---|
| Comparison Example 1 | 24 | 12.0 | 14.8 | 14.2 | 0.500 | YES |
| Comparison Example 2 | 24 | 14.4 | 14.8 | 14.2 | 0.600 | YES |

A condition of the study according to the first exemplary embodiment will be described. The study was conducted under the following condition to easily generate paper dust contamination and image defects such as image unevenness and spots. Specifically, a pattern on which a plurality of horizontal lines was printed was used as a print pattern for executing image formation, and paper dust was continuously supplied to the drum by continuously feeding 10000 sheets of paper. Canon Red Label Presentation, 80 g/m2, A4-size paper (500 sheets/bundle), were used as the paper.

Under the above-described condition, after execution of transfer processing, approximately 20 mg of paper dust for every 1 g of transfer residual toner was adhered to the photosensitive drum. This means a state where the amount of paper dust is twice the amount of paper dust adhered to the photosensitive drum after execution of transfer processing when commonly-used plain paper such as Xerox Vitality, 75 g/m2, Letter size paper, (500 sheets/bundle) is used. In this state, occurrence of paper dust contamination and image defects such as image unevenness and spots were checked.

The above-described condition is not limited to the value. In other words, the condition of the study is not limited to the above-described value as long as reduction of the development roller diameter has a beneficial effect on paper dust contamination and image defects such as image unevenness and spots, when the development roller diameter is reduced while maintaining a magnitude relationship between the development roller diameter and the diameters of the transfer roller and the cleaning roller. Specifically, absolute values of the roller diameters, a development nip width, and a processing speed are not limited to the above-described values.

In a second exemplary embodiment, the development roller diameter is also smaller than the transfer roller diameter and the cleaning roller diameter, and the only difference from the first exemplary embodiment is that the photosensitive drum 1, the development roller 6, the transfer roller 8, and the cleaning roller 11 are arranged in a same process cartridge.

Accordingly, content described in the present exemplary embodiment is similar to the content described in the exemplary embodiment 1-1, except that the photosensitive drum 1, the development roller 6, the transfer roller 8, and the cleaning roller 11 are arranged in the same process cartridge, so that description of the overlapping portion will be omitted.

Specifically, as illustrated in FIG. 1, an image forming apparatus according to the present exemplary embodiment includes a freely-replaceable process cartridge attachable to and detachable from a main body of the image forming apparatus. The process cartridge includes the cleaning roller 11, the transfer roller 8, and the development roller 6 arranged within the development unit, abutting on the photosensitive drum 1. Herein, the constituent elements of the process cartridge can be unitized into two units, i.e., a development unit including the development roller 6 and a drum unit including the transfer roller 8 having the photosensitive drum 1 and the cleaning roller 11. This is because rigidity thereof can also be increased by unitizing the elements into two units, and it is particularly important to arrange the transfer roller 8 serving as a paper dust adhering unit and the photosensitive drum 1 within a same unit.

As described above, in the second exemplary embodiment, since the development roller 6 abutting on the photosensitive drum 1, the transfer roller 8, and the cleaning roller 11 are arranged within the same cartridge (i.e., the same process cartridge), positional precision and rigidity of the rollers are improved.

Therefore, paper contamination is ameliorated when compared to the case where the development roller 6, the transfer roller 8, and the cleaning roller 11 are not arranged in the same process cartridge. Specifically, in a case where the constituent elements receive vibration caused by driving force while image formation is being executed, unevenness occurs in the amount of paper dust adhered to the photosensitive drum 1 due to variation in pressing force of the rollers and deviation in abutting positions of the rollers. However, in a case where the development roller 6 abutting on the photosensitive drum 1, the transfer roller 8, and the cleaning roller 11 are arranged in the same process cartridge, positional precision and rigidity of the respective rollers are improved, so that the adhesion state of paper dust on the photosensitive drum 1 becomes stable. Thus, paper contamination is ameliorated as illustrated in the following table 5. As illustrated in the table 5, it was found that the amount of paper dust adhered to the photosensitive drum 1 at the transfer portion was reduced by approximately 10% when compared to the case where the transfer roller 8 was not arranged within the process cartridge. Accordingly, it is possible to leave a margin for the capability to respond to generation of paper dust.

TABLE 5

| | Development Roller, Transfer Roller, and Cleaning Roller are housed within Same Process Cartridge | Paper Dust Transfer Rate (When First Exemplary Embodiment is 1) |
|---|---|---|
| First Exemplary Embodiment | NO | 1 |
| Second Exemplary Embodiment | YES | 0.9 |

<Superiority of the First, Second, and Third Exemplary Embodiments Over Comparison Examples>

Configurations of the first, the second, and a third exemplary embodiments and the superiority over comparison examples (conventional examples) will be described with reference to the table 6.

TABLE 6

| | Configuration | | | Suppression of Paper Dust Contamination |
|---|---|---|---|---|
| First Exemplary Embodiment 1-1 | Development Roller Dia. < Cleaning Roller Dia. Development Roller Dia. < Transfer Roller Dia. | Dia. Ratio of Development Roller/Drum: 0.433, Development roller Dia.: φ13 mm | | Good |
| First Exemplary Embodiment 1-2 | Development Roller Dia. < Cleaning Roller Dia. Development Roller Dia. < Transfer Roller Dia. | Dia. Ratio of Development Roller/Drum: 0.467, Development roller Dia.: φ14 mm | | Good |
| Second Exemplary Embodiment | Development Roller Dia. < Cleaning Roller Dia. Development Roller Dia. < Transfer Roller Dia. | Dia. Ratio of Development Roller/Drum: 0.433, Development roller Dia.: φ13 mm | Development Roller, Cleaning Roller, and Transfer Roller are arranged within Same Process Cartridge | Excellent |
| Third Exemplary Embodiment | Development Roller Dia. < Cleaning Roller Dia. Development Roller Dia. < Transfer Roller Dia. | Dia. Ratio of Development Roller/Drum: 0.467, Development roller Dia.: φ14 mm | Development Roller, Cleaning Roller, and Transfer Roller are arranged within Same Process Cartridge | Excellent |
| Comparison Example 1 | Cleaning Roller Dia. < Development Roller Dia. Transfer Roller Dia. < Development Roller Dia. | Dia. Ratio of Development Roller/Drum: 0.500, Development roller Dia.: φ15 mm | | Poor |
| Comparison Example 2 | Cleaning Roller Dia. < Development Roller Dia. Transfer Roller Dia. < Development Roller Dia. | Dia. Ratio of Development Roller/Drum: 0.600, Development roller Dia.: φ18 mm | | Poor |

<Points in the First Exemplary Embodiment Superior to Comparison Examples 1 and 2>

In each of the comparison examples 1 and 2, a diameter of the development roller 6 is larger than diameters of the cleaning roller 11 and the transfer roller 8. In this case, when a large amount of paper dust is generated, paper dust that cannot be collected by the cleaning roller 11 is easily transferred to the development roller 6 from the photosensitive drum 1 because a nip width between the development roller 6 and the photosensitive drum 1 is large. Further, sheet-conveying performance is degraded when the diameter of the transfer roller 8 is smaller than the diameter of the development roller 6, and paper dust is hardly collected when the diameter of the cleaning roller 11 is smaller than the diameter of the development roller 6.

On the contrary, the diameter of the development roller 6 according to the first exemplary embodiment is smaller than the diameters of the cleaning roller 11 and the transfer roller 8, i.e., the diameter of φ14 mm, and the ratio of the diameter to the diameter of the photosensitive drum 1 is small, i.e., 0.467 or less. Therefore, paper dust that has not been collected by the cleaning roller 11 is hardly transferred to the development roller 6 from the photosensitive drum 1, so that it is beneficial to suppress image defects such as image unevenness and spots.

<Points in the Second and Third Exemplary Embodiments Superior to Comparison Examples 1 and 2>

In each of the comparison examples 1 and 2, a diameter of the development roller 6 is larger than diameters of the cleaning roller 11 and the transfer roller 8. In this case, when a large amount of paper dust is generated, paper dust that has not been collected by the cleaning roller 11 is easily transferred to the development roller 6 from the photosensitive drum 1.

On the contrary, in each of the second and the third exemplary embodiments, a diameter of the transfer roller 6 is smaller than diameters of the transfer roller 8 and the cleaning roller 11, and these rollers 6, 8, and 11 are arranged in a same process cartridge. Accordingly, rigidities of respective rollers are improved, so that vibration (particularly, vibration of the transfer portion) caused by image-forming driving force is suppressed thereby. As a result, while adhesion of paper dust is suppressed by reducing a diameter of the development roller 6, adhesion of paper dust at abutting positions of respective rollers can also be suppressed. Therefore, the above-described configuration has more beneficial effect on paper dust contamination.

Further, in each of the comparison examples 1 and 2, paper dust contamination had also occurred when checking was conducted with respect to the case where these rollers 6, 8, and 11 were arranged in the same process cartridge. Therefore, it was found that reduction in diameter size of the development roller 6 had a dominant effect on the phenomenon, whereas improvement in rigidity had only a small effect thereon.

As described above, according to the above-described exemplary embodiments, paper dust 16 on the photosensitive drum 1 is made to be hardly collected by the development roller 6 in comparison with the transfer roller 8 and the cleaning roller 11, by reducing the diameter of the development roller 6 to be smaller than the diameters of the transfer roller 8 and the cleaning roller 11. With this configuration, contamination of paper dust and toner on the development roller 6 is suppressed, so that image defects such as image unevenness and spots are reduced, and image quality can be maintained more favorably.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:

a photosensitive drum;

a development roller configured to supply developer to the photosensitive drum; and a cleaning roller being in contact with the photosensitive drum, configured to clean a surface of the photosensitive drum, wherein a ratio of a diameter of the development roller to a diameter of the photosensitive drum is equal to or less than 0.467, and wherein a diameter of the cleaning roller is greater than the diameter of the development roller.

2. The image forming apparatus according to claim 1, further comprising a transfer roller configured to transfer a developer image formed on the photosensitive drum to a recording material.

3. The image forming apparatus according to claim 2, wherein the transfer roller has a paper dust buffering function.

4. The image forming apparatus according to claim 2, wherein the photosensitive drum, the development roller, the transfer roller, and the cleaning roller are arranged within the same cartridge attachable to and detachable from the image forming apparatus.

5. The image forming apparatus according to claim 4, further comprising a transfer applying unit configured to apply a transfer voltage for transfer of paper dust to the transfer roller from the photosensitive drum.

6. The image forming apparatus according to claim 2, wherein a contact area of the photosensitive drum and the development roller is set to be smaller than a contact area of the photosensitive drum and the transfer roller.

7. The image forming apparatus according to claim 1, wherein the cleaning roller is configured to have elasticity.

8. The image forming apparatus according to claim 7, wherein, a ratio, in which a contact area is decreased when only the diameter of the development roller is reduced, is defined as a contact area ratio, and when the contact area ratio in a case where the diameter of the development roller and the diameter of the photosensitive drum are the same is set to 1, the contact area ratio is set to 0.80 or less.

* * * * *